United States Patent [19]

Haegeman

[11] Patent Number: 5,021,154

[45] Date of Patent: Jun. 4, 1991

[54] MIXER/AERATOR FOR WASTE WATER

[76] Inventor: Johny H. Haegeman, 126, Steenweg naar Alsemberg, Buizingen B-1510, Belgium

[21] Appl. No.: 427,211

[22] Filed: Oct. 24, 1989

[30] Foreign Application Priority Data

Oct. 26, 1988 [BE] Belgium .............................. 8801233

[51] Int. Cl.⁵ .............................................. B01F 3/04
[52] U.S. Cl. ............................... 210/221.2; 210/242.2; 261/91; 261/120
[58] Field of Search ................... 210/221.2, 219, 242.2, 210/416.1, 759; 261/91, 120

[56] References Cited

U.S. PATENT DOCUMENTS

| | | | |
|---|---|---|---|
| 3,521,864 | 7/1970 | Welles, Jr. | 261/91 |
| 3,797,809 | 3/1974 | Syndor, Jr. | 261/91 |
| 3,846,516 | 11/1974 | Carlson | 261/91 |
| 3,871,581 | 3/1975 | Dively | 261/91 |
| 4,358,413 | 11/1982 | Brucker | 210/219 |
| 4,540,528 | 9/1985 | Haegeman | 210/219 |

FOREIGN PATENT DOCUMENTS 55-18260  2/1980  Japan .................................. 210/219

Primary Examiner—James C. Housel
Attorney, Agent, or Firm—Pollock, Vande Sande and Priddy

[57] ABSTRACT

Apparatus designed to mix and/or aerate waste water by floating on the surface of the water, comprising a motor (2) having a shaft (3) oriented downwards and driving a propeller (4), a guide tube (5), a water-deflecting device (6) and at least two floats, an upper float (9) and a lower float (10), mounted apart one above the other and arranged concentrically relative to the axis of the motor (2), which allow the apparatus (1) to be positioned between two limiting levels relative to the surface of the water:
  a lower level where only the upper float (9) is situated on the surface of the water and in which the apparatus is suitable for use as a mixer and
  a upper level where only the lower float (10) is operational and in which the apparatus is suitable for use as an aerator.

8 Claims, 2 Drawing Sheets

MIXER/AERATOR FOR WASTE WATER

FIELD OF THE INVENTION

The present invention relates to an apparatus designed to mix and/or aerate waste water by floating on the surface of the water.

BACKGROUND OF THE INVENTION

This kind of apparatus comprises in general an electric motor, the shaft of which is oriented downwards and which drives a propeller capable of propelling the water, a lower guide pipe or cone, a stabilizer, an upper deflector and at least one float designed to keep the apparatus on the surface of the water.

Depending on the direction of rotation of the propeller, the apparatus can be used either as a mixer by sucking the water which is situated at the surface of the tank towards the propeller which propels this water towards the bottom of the tank, or as an aerator by sucking the water from the bottom of the tank and propelling it onto the surface of the water.

It will be understood immediately that, in order to perform these two different operations, it is necessary to be able to adjust the immersion level of the apparatus relative to the surface of the water in order to obtain high degrees of efficiency.

Floating mixers or aerators designed for the treatment of waste water are known in a general way. Thus, for example, Belgian Patent BE 884,216 describes a device for mixing gas with a liquid, or vice versa, and also for degassing a liquid, consisting of a power generator driving a shaft equipped with a propeller which is situated below the surface of the water, while a blade wheel is fixed to the part of the shaft situated above the propeller.

A similar apparatus has been described in Patent BE 893,687 and is characterized by the fact that the propeller and the blade wheel form part of a single combined rotor body, the lower part of which consists of an axial propeller pump and the upper part of which consists of a centrifugal rotor.

For the treatment of waste water, it is however, advantageous to saturate the water periodically and alternately with oxygen or to mix the former simply without special addition of oxygen.

In this way, it is possible for the processes, which are known to any specialist and consist in the alternate nitrification and denitrification processes, to be controlled more easily while keeping them under supervision. The consequence of this is that the total quantity of oxygen which is necessary for the treatment of the waste water can be substantially reduced.

Document DE-A-2,119,638 discloses a surface aerator fitted with a float comprising two independent chambers, one of which is connected to a liquid or air supply pipe so as to be able to fill or empty one chamber of the float, thus allowing a height adjustment of the assembly. This height adjustment relative to the water level is, however, exclusively linked to the adjustment of the water throughput and of the oxygen supply required.

Patent AT-PS-378,167 describes a floating surface aerator which can be transformed into a mixer by controlled immersion of the assembly. In order to do this, it is fitted with a device for adjusting the immersion level which employs a float mounted in the central position which can be filled with ballast as desired and which is stabilized by at least one additional float a considerable distance away and connected in a flexible manner to cross-members, for example by means of a chain. The result is then that, if the immersion is sufficient, the float or floats situated apart have a stabilizing effect on the mixer/aerator via the cross-member and the taut chain.

An apparatus of this kind has, however, serious disadvantages.

Namely, the separated additional floats always float on the surface of the water and therefore obstruct the ejection path of the water which is distributed over the surface of the water during the aeration phase. The result is a large decrease in the efficiency and also the stability owing to the appearance of uncontrolled eddies around the floats. Moreover, the addition of cross-members, chains and additional separated floats makes the apparatus more costly, mechanically more sensitive and more difficult to maintain.

If the mixer-aerator is partially submerged by filling the central float with ballast, the device is then stabilized only from the moment when the separated floats are able to exert a force on the cross-members, that is to say from the moment when the chain for joining the cross-members to the float is taut.

When the mixer-aerator is in the floating position, their stabilizing function does not exist and this situation continues as the immersion progresses until the joining chain is taut. Any displacement of the ballast in the fillable float, for example because the liquid filling the fillable float is displaced by a wave or by the effect of the wind, causes a large destabilization of the device, which has to be compensated, in a preferred embodiment of the invention, by placing perforated intermediate partitions in the fillable ballast tank.

In order to prevent the air from being sucked directly through the propeller when the device is immersed and operating as a mixer, it is necessary to arrange additionally a protective plate between the surface of the water and the propeller. This protective plate, mounted above the fillable float, makes the stabilization of the device even more problematical in view of the fact that, whatever the degree of immersion, it displaces the center of gravity of the device even further above the center of flotation of the central float; in other words, the head of the device is thereby made heavier. It is above all during the intermediate phases of the immersion where the floats fixed to the cross-members are still not able to exert any stabilizing action that an arrangement of this kind is a disadvantage, especially as uncontrolled movements of the ballast in the fillable float may further aggravate the situation. Moreover, the protective plate, which is brought into a position where it is to a certain depth completely below the surface of the water in the event of filling, constitutes a serious obstacle with respect to returning the device to the floating position, in view of the fact that all the water which is situated above this plate has to be driven out laterally before the unit can emerge from the water again in order to operate as an aerator.

SUMMARY OF THE INVENTION

The object of the present invention is to eliminate these disadvantages by virtue of a simple and reliable apparatus.

Further data and characteristics of the invention will be described below in a non-limiting exemplary embodiment with the aid of the accompanying figures.

DESCRIPTION OF PREFERRED EMBODIMENTS

Figure 1:
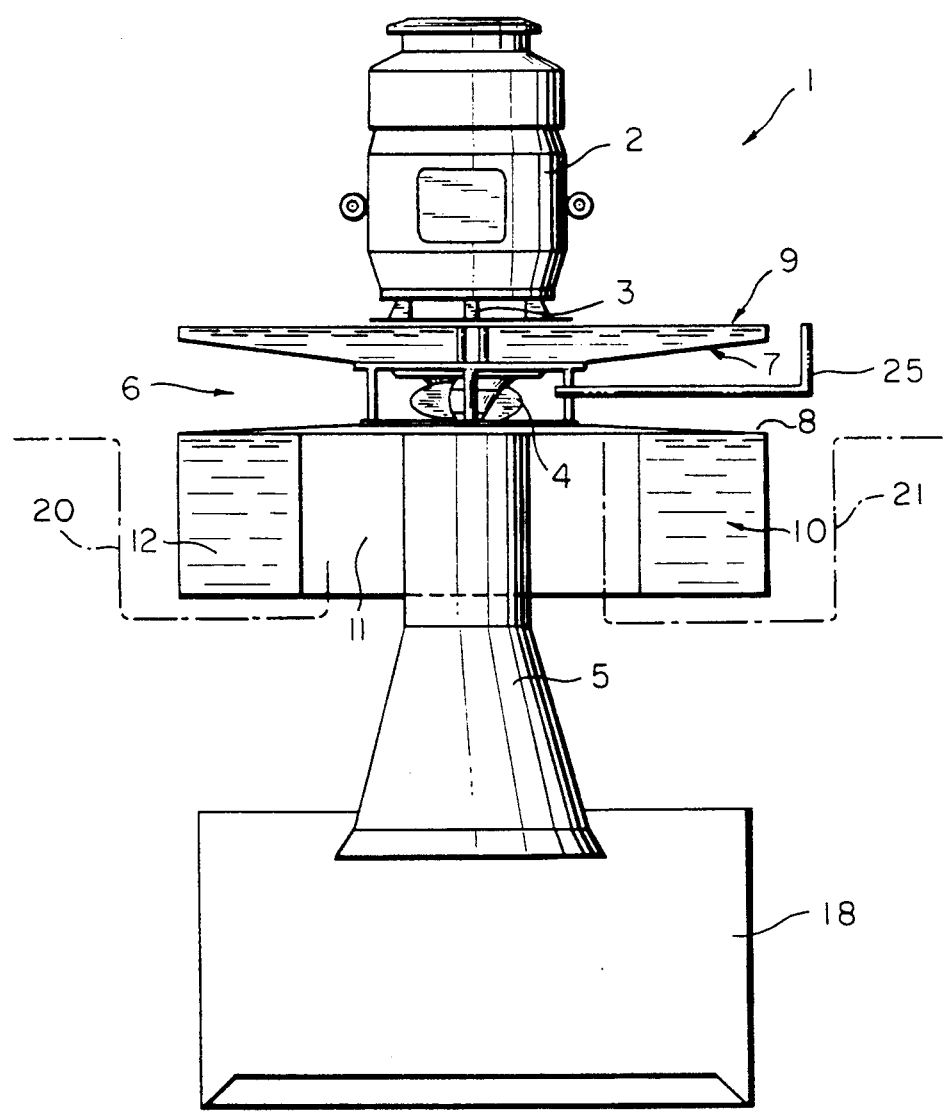
FIG. 1 shows a side view of the mixer-aerator in accordance with the present invention, with the floats viewed in section.

As shown in FIG. 1, the mixer-aerator apparatus 1 comprises a motor 2 which drives via a shaft 3 a propeller 4 which displaces the water. Below the propeller 4 is mounted a tube having a water guide cone 5 and a stabilizing cross 18. Depending on the direction of rotation of this propeller 4, the water is sucked into the water guide tube 5 and is distributed uniformly on top of the surface of the water by a deflecting device 6, in the case where the apparatus operates as an aerator or, conversely, the surface water is sucked through the deflecting device 6 and is propelled downwards by the water guide tube 5 in the case where the apparatus acts as a mixer. In the latter case, air can be brought directly into the region of the propeller by a separate air pipe 25 so that the mixing of air under water is one of the possibilities.

In accordance with the invention, the deflecting device 6 is formed by the opening between two flotation elements 9, 10, mounted apart one above the other and arranged concentrically relative to the axis of the motor 2, the opening of the deflecting device 6 being delimited by the profiled lower edge 7 of the upper flotation element 9 and the upper edge 8 of a composite flotation element 10 which comprises a float 12 and a ballast chamber 11 arranged concentrically inside the float 12 and fixedly mounted around the guide tube 5. This chamber 11 can be filled as desired with ballast which is, for example, the surrounding water, so that its plane of flotation can be adjusted between two limiting values. In order to effect this filling or emptying of the chamber 11, a water inlet and outlet pipe 20 and an air inlet and outlet 21 are provided, these pipes 20 and 21 being connected in a manner known per se to a remote control and monitoring system (not shown). If the chamber 11 is completely filled with ballast, the plane of flotation of the combined flotation elements 10 and 9 is still sufficiently high to prevent the upper flotation element 9 from falling completely below the level of the water.

Figure 2:
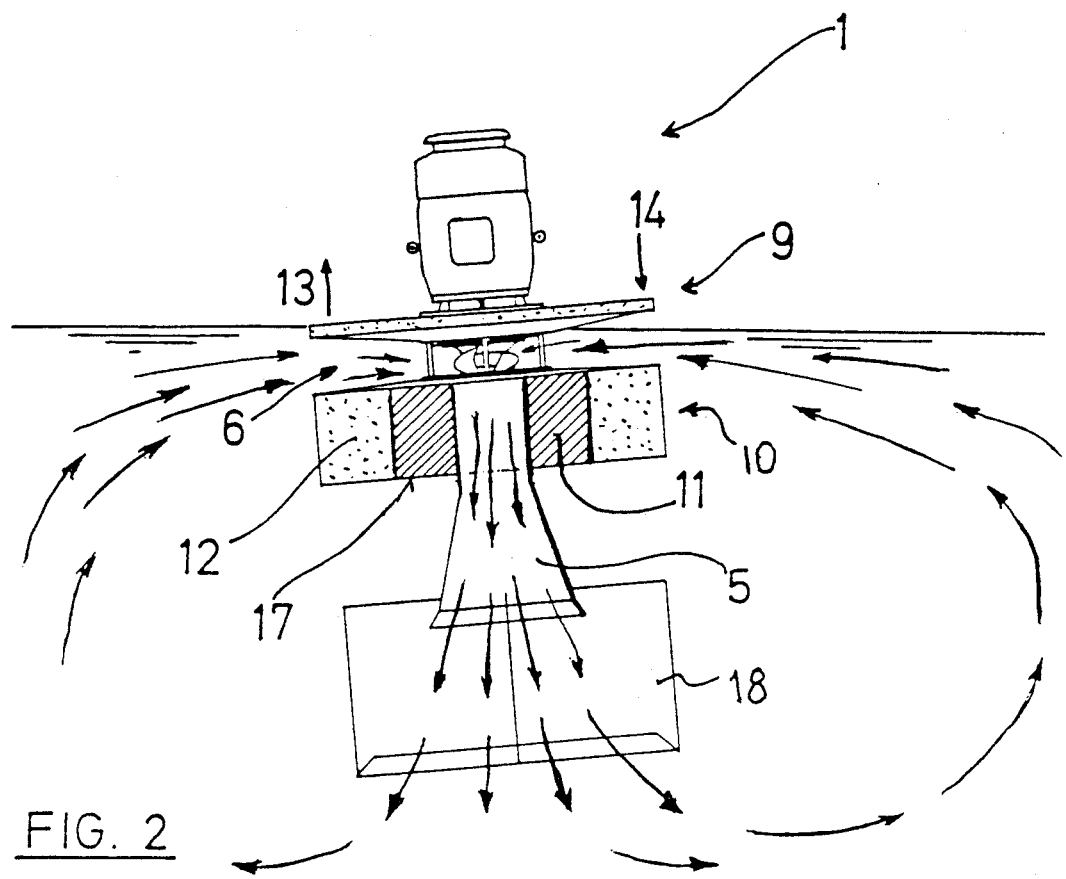
FIG. 2 shows a side view of the mixer-aerator in the immersed state, that is to say operating as a mixer. The central floats are shown in section.

FIG. 2 shows diagrammatically the situation when the apparatus 1 operates as a mixer. The apparatus is shown in an exaggerated inclined position in order to illustrate how the upper flotation element 9 exerts a couple of forces, shown by the arrows 13 and 14, so as to stabilize the mixer-aerator in the vertical position. A similar function is performed by the annular float 12 which surrounds the central chamber 11 filled with ballast, which is itself mounted in turn around the water guide tube 5.

Figure 3:
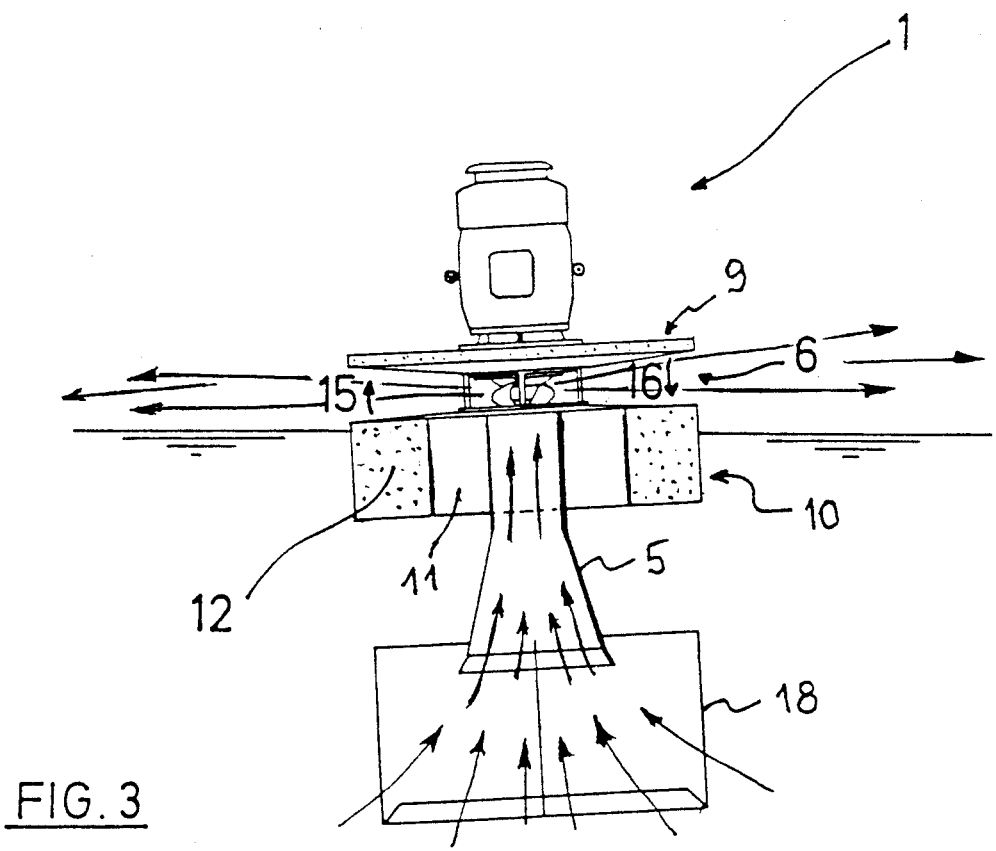
FIG. 3 shows a side view of the mixer-aerator in the floating position, that is to say operating as an aerator. The central floats are shown in section.

Under no circumstances does the upper flotation element 9 disappear completely under the surface of the water, so that, if the apparatus 1 is raised higher out of the water in order to be able to operate as an aerator as indicated in FIG. 3, no body of water situated on top needs to be removed. The upper flotation element 9 also performs the role of a protective device for preventing the air from being sucked directly by the propeller 4 via the deflecting device 6. As already mentioned, an embodiment as a mixer also allows air to be brought directly into the region of the propeller 4 via a separate air pipe 25, so that mixing with air, under water, is within the scope of its possibilities. The lower edge 17 of the flotation element 10, consisting of the float 12 and the chamber 11 capable of being filled with ballast, prevents, moreover, the water from being able to reach the propeller 4 via a route other than the deflecting device 6.

In order to be able to operate as an aerator, the ballast is drained off totally or partially from the chamber 11 so that the plane of flotation rises sufficiently for the deflecting device 6 to be at the desired height relative to the surface of the water, as shown in FIG. 3. The fixed float 12 exerts a stabilizing action by virtue of its annular form around the empty chamber 11, whatever the degree of immersion of the apparatus 1. FIG. 3 shows the apparatus 1 in an exaggerated inclined position in order to illustrate how a couple of forces shown by the arrows 15 and 16 ensures the stabilization in the vertical position.

Other embodiments may be envisaged without departing from the scope of the present invention.

The apparatus 1 may also be provided with one or more deflectors mounted into the stabilizing cross 18 or disposed near to said stabilizing cross in order to improve the water flow propelled from or sucked by the apparatus 1.

I claim:

1. Apparatus for selectively mixing or aerating waste water by floating on the surface of the water, comprising a reversible motor having a shaft oriented downwards and driving a propeller, a guide tube disposed below said propeller, and at least two flotation elements mounted in spaced relation one above the other and arranged concentrically relative to the axis of the motor to form a water deflecting device between said flotation elements in the region of said propeller, means for operating said flotation elements so as to allow the apparatus to be positioned between two limiting levels relative to the surface of the water, namely a lower level where only the upper one of said flotation elements is situated on the surface of the water and in which the apparatus is suitable for use as a mixer and an upper level where only the lower one of said flotation elements is operational and in which the apparatus is suitable for use as an aerator.

2. Apparatus according to claim 1 wherein the lower one of said flotation elements is composed of a float disposed at the outer periphery of said flotation element, and said operating means includes a reversible ballast chamber located inside of said float.

3. Apparatus according to claim 1 wherein said lower one of said flotation elements is mounted around said guide tube.

4. Apparatus according to claim 1 wherein said waterdeflecting device is formed by an opening between said flotation elements delimited by a profiled lower edge of the upper one of said flotation elements and the upper edge of the lower one of said flotation elements.

5. Apparatus according to claim 2 wherein said reversible ballast chamber is surrounded concentrically by and fixedly connected to said float.

6. Apparatus according to claim 1 wherein the upper one of said flotation elements forms a protective device that prevents air from being sucked directly by said propeller via said water deflecting device when the apparatus is at said lower level.

7. Apparatus according to claim 1 wherein the lower one of said flotation elements has a lower edge which prevents water from reaching said propeller via a route other than said deflecting device when the apparatus is at said lower level.

8. Apparatus according to claim 1 including a separate pipe for bringing air from the surface of the water directly into the region of said propeller to aerate the water when the apparatus functions as a mixer at said lower level.

* * * * *